(12) United States Patent
Ruth et al.

(10) Patent No.: US 12,634,343 B2

(45) Date of Patent: *May 19, 2026

(54) DETECTING OPERATION OF AN AUTONOMOUS VEHICLE ON AN UNTRUSTED NETWORK

(71) Applicant: GM GLOBAL TECHNOLOGY OPERATIONS LLC, Detroit, MI (US)

(72) Inventors: Mike Ruth, Mountain View, CA (US); Timothy Strazzere, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 625 days.

This patent is subject to a terminal disclaimer.

(21) Appl. No.: 17/749,074

(22) Filed: May 19, 2022

(65) Prior Publication Data

US 2022/0278971 A1 Sep. 1, 2022

Related U.S. Application Data

(63) Continuation of application No. 16/224,296, filed on Dec. 18, 2018, now Pat. No. 11,368,440.

(51) Int. Cl.
H04L 29/06 (2006.01)
G05D 1/00 (2006.01)
(Continued)

(52) U.S. Cl.
CPC ......... H04L 63/164 (2013.01); G05D 1/0088 (2013.01); H04L 63/0263 (2013.01); H04L 63/0485 (2013.01); H04W 84/12 (2013.01)

(58) Field of Classification Search
CPC ... H04L 63/0485; H04L 45/02; G05D 1/0088; H04W 84/12
(Continued)

(56) References Cited

U.S. PATENT DOCUMENTS 7,231,665 B1 * 6/2007 McArdle ............. H04L 63/1441
726/13
8,869,270 B2 10/2014 Touboul
(Continued)

FOREIGN PATENT DOCUMENTS

KR 101781135 B1 9/2017

OTHER PUBLICATIONS

Fang, "Smart Grid—The New and Improved Power Grid: A Survey", 2011, IEEE, pp. 1-38 (Year: 2011).*
(Continued)

*Primary Examiner* — Taghi T Arani
*Assistant Examiner* — Gregory A Lane
(74) *Attorney, Agent, or Firm* — Honigman LLP; Matthew H. Szalach; Jonathan P. O'Brien

(57) ABSTRACT

Various technologies described herein pertain to detecting operation of an autonomous vehicle on an untrusted network. The autonomous vehicle retrieves a beacon token from a data store of the autonomous vehicle. The beacon token comprises an identifier for the autonomous vehicle and an identifier for a server computing device. The autonomous vehicle generates a data packet based upon the beacon token, wherein the data packet includes the identifier for the autonomous vehicle. The autonomous vehicle transmits the data packet to the server computing device. When the data packet is transmitted via a trusted network, networking rules of the trusted network prevent the data packet from being received by the server computing device. When the data packet is transmitted via the untrusted network, the server computing device receives the data packet. Responsive to receiving the data packet, the server computing device generates and transmits an alert to a computing device.

20 Claims, 16 Drawing Sheets

(51) Int. Cl.
H04L 9/40 (2022.01)
H04W 84/12 (2009.01)

(58) Field of Classification Search
USPC .......................................................... 726/23
See application file for complete search history.

(56) References Cited

U.S. PATENT DOCUMENTS

| | | | |
|---|---|---|---|
| 9,946,531 | B1 | 4/2018 | Fields et al. |
| 10,075,469 | B1 | 9/2018 | Brown et al. |
| 2010/0036959 | A1 | 2/2010 | Trace et al. |
| 2010/0165830 | A1* | 7/2010 | Amir ....................... H04L 45/04 |
| | | | 370/216 |
| 2011/0044444 | A1 | 2/2011 | Abramson |
| 2011/0208866 | A1* | 8/2011 | Marmolejo-Meillon .................... |
| | | | H04L 67/04 |
| | | | 709/227 |
| 2015/0079942 | A1 | 3/2015 | Kostka et al. |
| 2015/0331422 | A1 | 11/2015 | Hartung et al. |
| 2015/0341331 | A1* | 11/2015 | Weksler .............. H04L 63/1433 |
| | | | 726/4 |
| 2015/0358436 | A1* | 12/2015 | Kim .................... H04L 63/0428 |
| | | | 370/392 |
| 2016/0026837 | A1 | 1/2016 | Good et al. |
| 2016/0036558 | A1 | 2/2016 | Ibrahim et al. |
| 2016/0362084 | A1 | 12/2016 | Martin et al. |
| 2017/0006417 | A1* | 1/2017 | Canoy ............... H04B 7/18506 |
| 2017/0086011 | A1 | 3/2017 | Neves et al. |
| 2017/0126705 | A1* | 5/2017 | Mirashrafi ........... H04L 63/102 |
| 2018/0160360 | A1* | 6/2018 | Zhou ..................... H04W 12/12 |
| 2018/0219865 | A1 | 8/2018 | Das |
| 2018/0234844 | A1 | 8/2018 | Lavi |
| 2018/0255150 | A1 | 9/2018 | Williams et al. |
| 2018/0351919 | A1 | 12/2018 | Gorzellik et al. |
| 2019/0097974 | A1* | 3/2019 | Martz ................. H04L 63/0263 |
| 2019/0098007 | A1 | 3/2019 | Coleman et al. |
| 2019/0121961 | A1 | 4/2019 | Coleman et al. |
| 2020/0045554 | A1* | 2/2020 | Zhang ................... H04W 16/02 |
| 2020/0195622 | A1 | 6/2020 | Ruth et al. |
| 2021/0037355 | A1 | 2/2021 | Brown et al. |

OTHER PUBLICATIONS

Agiwal, "Next Generation 5G Wireless Networks: A Comprehensive Survey", 2016, IEEE, vol. 18, pp. 1617-1650 (Year: 2016).*
"Office Action for U.S. Appl. No. 16/224,296", Mailed Date: Jul. 23, 2021, 28 pages.
"Response to the Office Action for U.S. Appl. No. 16/224,296", filed Oct. 25, 2021, 13 pages.
"Notice of Allowance and Fees Due for U.S. Appl. No. 16/224,296", Mailed Date: Feb. 23, 2022, 9 pages.
Zhang, et al., "OpenVDAP: An Open Vehicular Data Analytics Platform for CAVs", In IEEE, 2018, 11 pages.

* cited by examiner

BEACON TOKEN
400

IDENTIFIER FOR AN
AUTONOMOUS VEHICLE    402

IDENTIFIER FOR A SERVER
COMPUTING DEVICE    404

FIG. 4

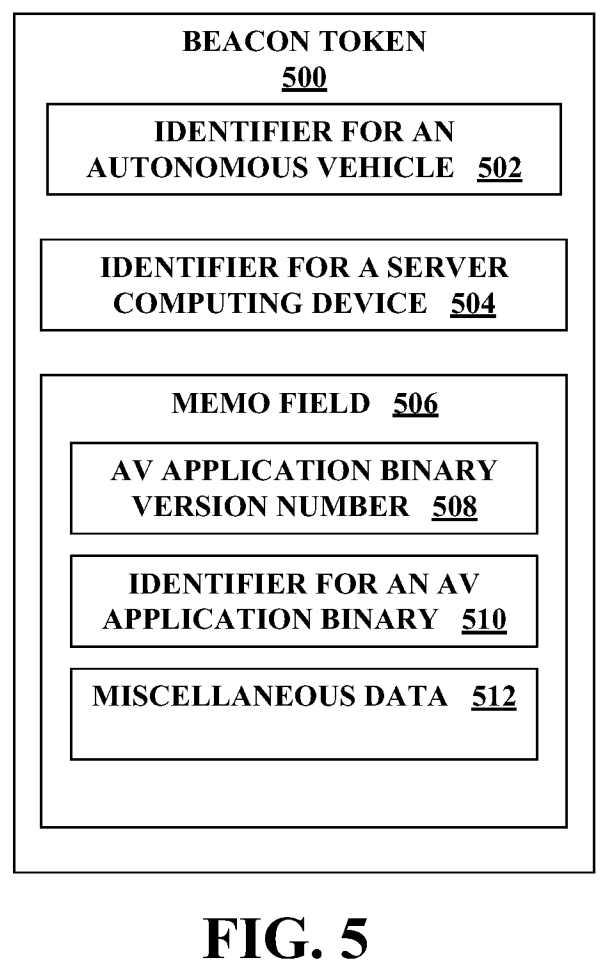

BEACON TOKEN
500

IDENTIFIER FOR AN AUTONOMOUS VEHICLE 502

IDENTIFIER FOR A SERVER COMPUTING DEVICE 504

MEMO FIELD 506

AV APPLICATION BINARY VERSION NUMBER 508

IDENTIFIER FOR AN AV APPLICATION BINARY 510

MISCELLANEOUS DATA 512

FIG. 5

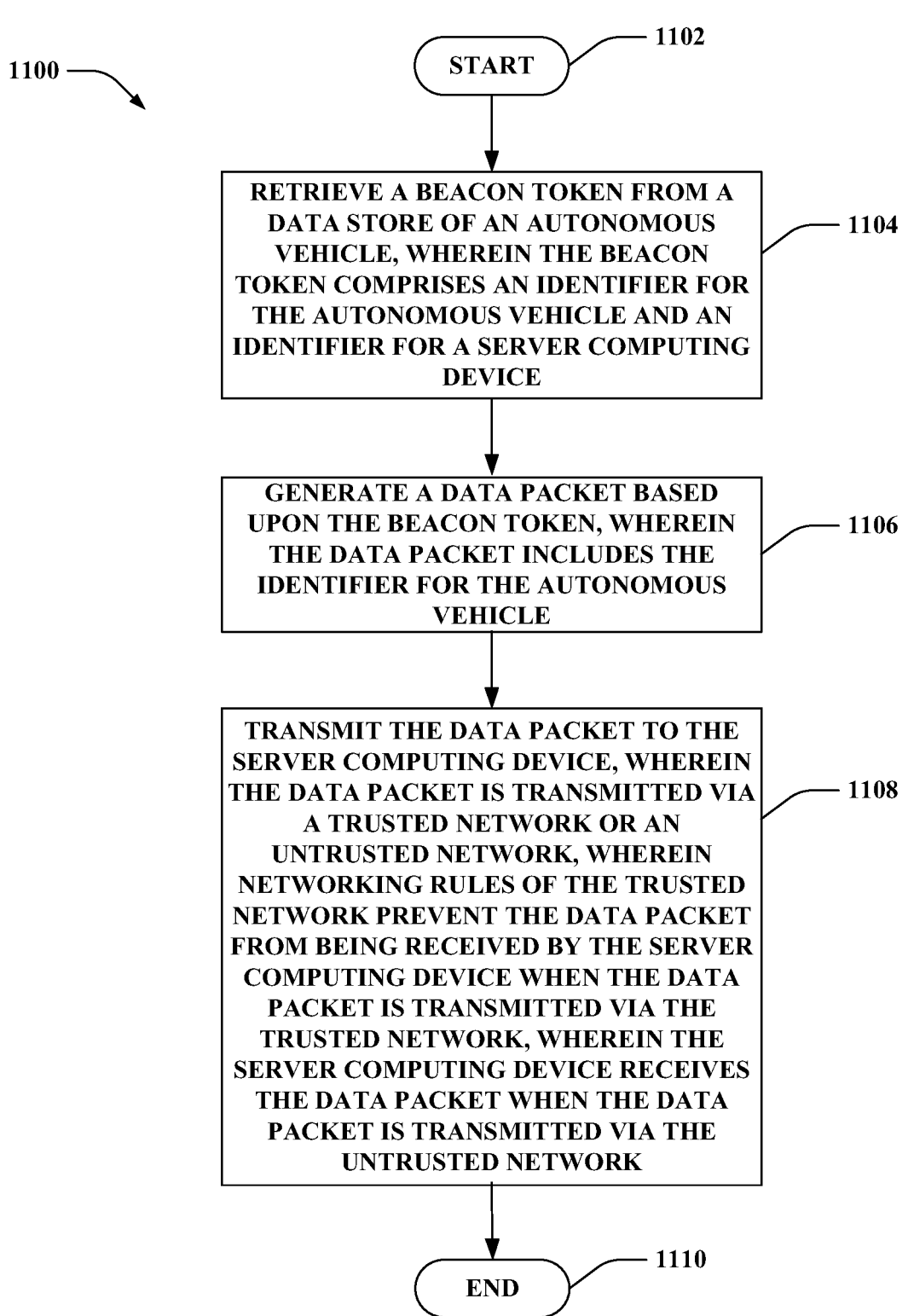

1100

1102 — START

1104 — RETRIEVE A BEACON TOKEN FROM A DATA STORE OF AN AUTONOMOUS VEHICLE, WHEREIN THE BEACON TOKEN COMPRISES AN IDENTIFIER FOR THE AUTONOMOUS VEHICLE AND AN IDENTIFIER FOR A SERVER COMPUTING DEVICE

1106 — GENERATE A DATA PACKET BASED UPON THE BEACON TOKEN, WHEREIN THE DATA PACKET INCLUDES THE IDENTIFIER FOR THE AUTONOMOUS VEHICLE

1108 — TRANSMIT THE DATA PACKET TO THE SERVER COMPUTING DEVICE, WHEREIN THE DATA PACKET IS TRANSMITTED VIA A TRUSTED NETWORK OR AN UNTRUSTED NETWORK, WHEREIN NETWORKING RULES OF THE TRUSTED NETWORK PREVENT THE DATA PACKET FROM BEING RECEIVED BY THE SERVER COMPUTING DEVICE WHEN THE DATA PACKET IS TRANSMITTED VIA THE TRUSTED NETWORK, WHEREIN THE SERVER COMPUTING DEVICE RECEIVES THE DATA PACKET WHEN THE DATA PACKET IS TRANSMITTED VIA THE UNTRUSTED NETWORK

1110 — END

1302 — START

1304 — RECEIVE AN ALERT FROM A SERVER COMPUTING DEVICE, WHEREIN THE ALERT COMPRISES AN IDENTIFIER FOR AN AUTONOMOUS VEHICLE AND AN IDENTIFIER FOR AN UNTRUSTED NETWORK

1306 — PRESENT THE ALERT ON A DISPLAY OF THE COMPUTING DEVICE

1308 — END

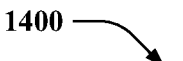
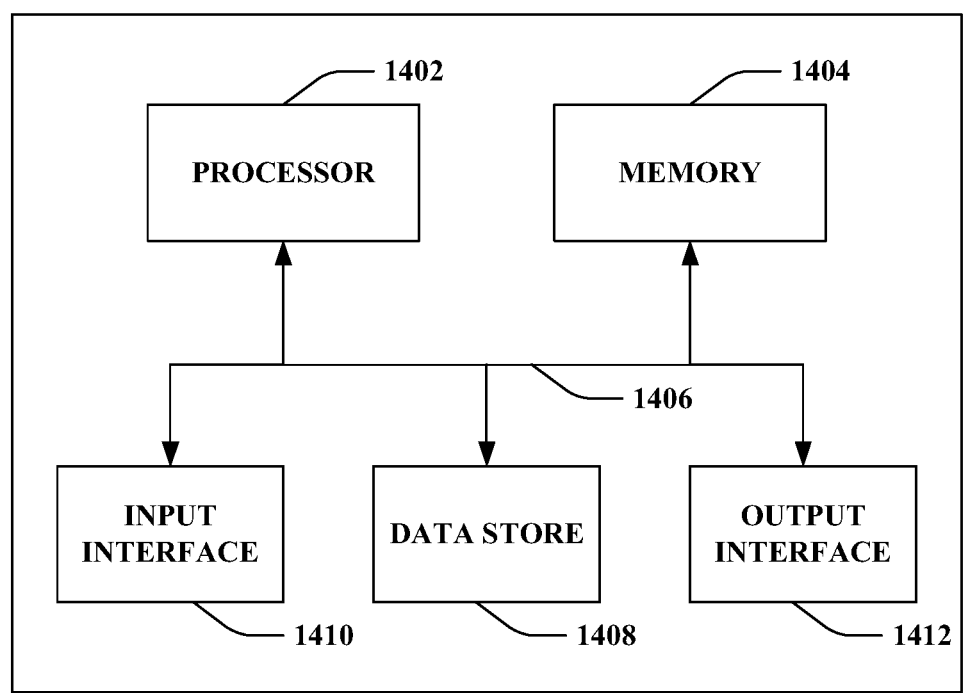
FIG. 14

DETECTING OPERATION OF AN AUTONOMOUS VEHICLE ON AN UNTRUSTED NETWORK

CROSS-REFERENCE TO RELATED APPLICATION

This application is a continuation of U.S. patent application Ser. No. 16/224,296, filed on Dec. 18, 2018, and entitled "DETECTING OPERATION OF AN AUTONOMOUS VEHICLE ON AN UNTRUSTED NETWORK", the entirety of which is incorporated herein by reference.

BACKGROUND

An autonomous vehicle is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

As an autonomous vehicle operates, the autonomous vehicle may communicate with computing devices using various networks (e.g., cellular networks, networks of Internet providers of the cellular networks, wireless local area networks (WLANs), etc.) in order to facilitate accomplishing various actions (e.g., picking up passengers, planning routes, etc.). In an example, the autonomous vehicle may communicate with a computing device over a first network at a first location in a driving environment and the autonomous vehicle may communicate with the computing device over a second network at a second location in the driving environment. In another example, the autonomous vehicle may communicate with the computing device over a WLAN when the autonomous vehicle is within an operating range of the WLAN and the autonomous vehicle may communicate over a cellular network when the autonomous vehicle is not within the operating range of the WLAN.

It is desirable for the autonomous vehicle to communicate over (i.e., operate on) trusted networks (i.e., networks that an entity that is responsible for the autonomous vehicle trusts to securely send and receive data thereon). Moreover, in the event that the autonomous vehicle does communicate over untrusted networks (i.e., networks that the entity does not trust to securely send and receive data thereon) or unknown networks (i.e., networks that the entity is uncertain as to trust to securely send and receive data thereon), it is desirable to know the identity of the autonomous vehicle and the identity of the untrusted (or unknown) network.

Conventionally, autonomous vehicles have typically not been configured with functionality pertaining to detection of operation of an autonomous vehicle on an untrusted network. Even if measures have been implemented to detect operation of the autonomous vehicle on the untrusted network, these measures tend to require that the autonomous vehicle itself detect that it is operating on the untrusted network. The autonomous vehicle then must attempt to relay an indication that the autonomous vehicle is operating on the untrusted network back to a trusted entity over the untrusted network, which is undesirable.

SUMMARY

The following is a brief summary of subject matter that is described in greater detail herein. This summary is not intended to be limiting as to the scope of the claims.

Described herein are various technologies that pertain to detecting operation of an autonomous vehicle on an untrusted network. More specifically, described herein is a computing environment comprising an autonomous vehicle and a server computing device. The autonomous vehicle generates a data packet based upon a beacon token stored in a data store of the autonomous vehicle and transmits the data packet to the server computing device. When the data packet is transmitted over a trusted network, networking rules of the trusted network prevent the data packet from being received by the server computing device. When the data packet is transmitted over an untrusted network, the server computing device receives the data packet, thereby indicating to the server computing device that the autonomous vehicle is operating on an untrusted network.

According to various embodiments, an autonomous vehicle comprises a computing system. The computing system comprises at least one networking component that enables communication over a plurality of networks (e.g., cellular networks, wireless local area networks (WLANs), etc.). The computing system also comprises a data store comprising a beacon token. The beacon token comprises an identifier for the autonomous vehicle and an identifier for a server computing device. In an example, the server computing device may execute an autonomous vehicle backend application that is configured to facilitate operation of the autonomous vehicle and other autonomous vehicles. The beacon token may be loaded into the data store when the autonomous vehicle is provisioned (e.g., when the autonomous vehicle is prepared for operation for the first time).

In operation, as the autonomous vehicle operates and communicates with the server computing device (or another server computing device), the computing system of the autonomous vehicle retrieves the beacon token from the data store. The computing system then generates a data packet based upon the beacon token, wherein the data packet includes the identifier for the autonomous vehicle.

The computing system then transmits the data packet to the server computing device based upon the identifier for the server computing device by way of the at least one networking component. When the computing system transmits the data packet over a trusted network in the plurality of networks, networking rules of the trusted network prevent the data packet from being received by the server computing device. For instance, a firewall of the trusted network may prevent the server computing device from receiving the data packet. Thus, when the autonomous vehicle is operating on the trusted network, the server computing device does not receive the data packet. However, when the computing system transmits the data packet over an untrusted network in the plurality of networks, the server computing device receives the data packet. The autonomous vehicle may repeatedly transmit the data packet at a defined time interval (e.g., every 1-3 seconds).

In an embodiment, responsive to receiving the data packet, the server computing device may determine an identity of the untrusted network based upon the data packet. The server computing device may also generate an alert based upon the data packet. The alert may include the identifier for the autonomous vehicle and the identity of the untrusted network. The server computing device may then transmit the alert to a computing device, whereupon the computing device may present the alert on a display.

The above-described technologies present various advantages over conventional technologies pertaining to network security for autonomous vehicles. First, the above-described technologies enable detecting that an autonomous vehicle is operating on an untrusted network. Second, the above-described technologies do not require that the autonomous vehicle itself detect that it is operating on an untrusted network. Rather, the server computing device described above detects operation of the autonomous vehicle on the untrusted network.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 illustrates a functional block diagram of a beacon token.

FIG. 5 illustrates a functional block diagram of a beacon token.

FIG. 11 is a flow diagram that illustrates an exemplary methodology performed by an autonomous vehicle for detecting operation of the autonomous vehicle on an untrusted network.

FIG. 14 illustrates an exemplary computing device.

DETAILED DESCRIPTION

Figure 1:
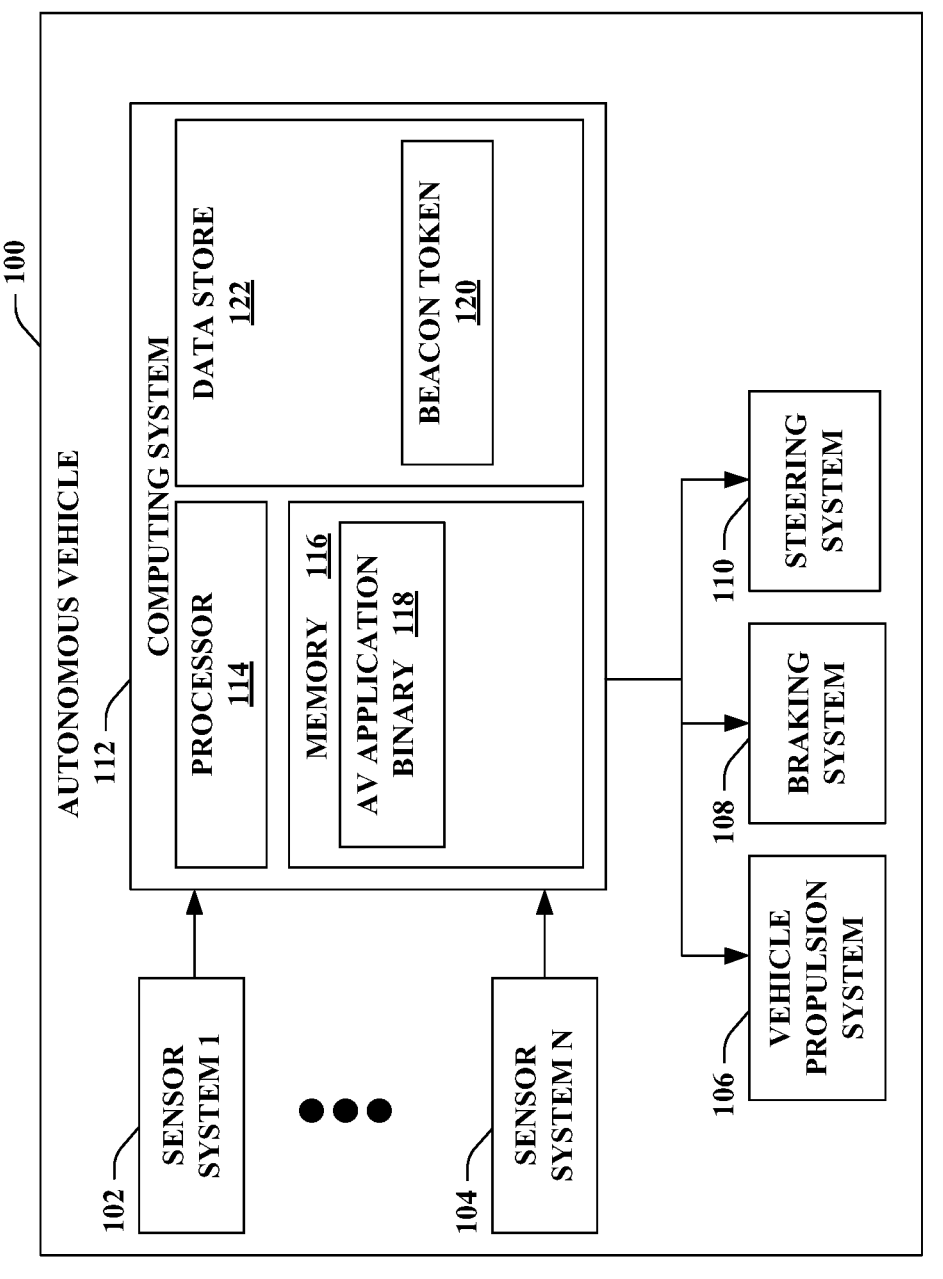
FIG. 1 illustrates a functional block diagram of an exemplary autonomous vehicle.

Various technologies pertaining to detecting operation of an autonomous vehicle on an untrusted network are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor (unless clearly indicated otherwise). The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera sensor (image) system. Other exemplary sensor systems included in the sensor systems 102-104 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110 (collectively, "the mechanical systems 106-110"). The vehicle propulsion system 106 may be an electric motor, an internal combustion engine, or a combination thereof. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 further includes a computing system 112. The computing system 112 comprises a processor 114 and memory 116. The memory 116 includes an autonomous vehicle application binary 118 (abbreviated as "AV application binary 118" in FIG. 1 and subsequent figures). The autonomous vehicle application binary 118 (when executed by the processor 114) is configured to facilitate operation of the autonomous vehicle 100. For instance, the autonomous vehicle application binary 118 may include functionality pertaining to route planning, perception, tracking objects around the autonomous vehicle, etc. Although the autonomous vehicle application binary 118 is depicted as being stored in the memory 116, it is to be understood that the autonomous vehicle application binary 118 may also be retained in a data store 122 (described below).

The autonomous vehicle 100 may also include the data store 122. The data store 122 may include a beacon token 120. As will be described in greater detail below, the beacon token 120 is configured to facilitate detecting when the autonomous vehicle 100 is communicating over (i.e., operating on) an untrusted network. Although the beacon token is depicted as being stored in the data store 122, it is to be understood that the beacon token 120 may also be stored in the memory 116. The beacon token 120 may be received by the computing system 112 when the autonomous vehicle 100 is initially provisioned or when the autonomous vehicle application binary 118 receives an update. The computing system 122 may then store the autonomous vehicle application binary 118 and the beacon token 120 in the data store 122.

Although the beacon token 120 is depicted as being separate from the autonomous vehicle application binary 118, it is to be understood that, in an embodiment, the beacon token 120 may be integrated into the autonomous vehicle application binary 118.

Figure 2:
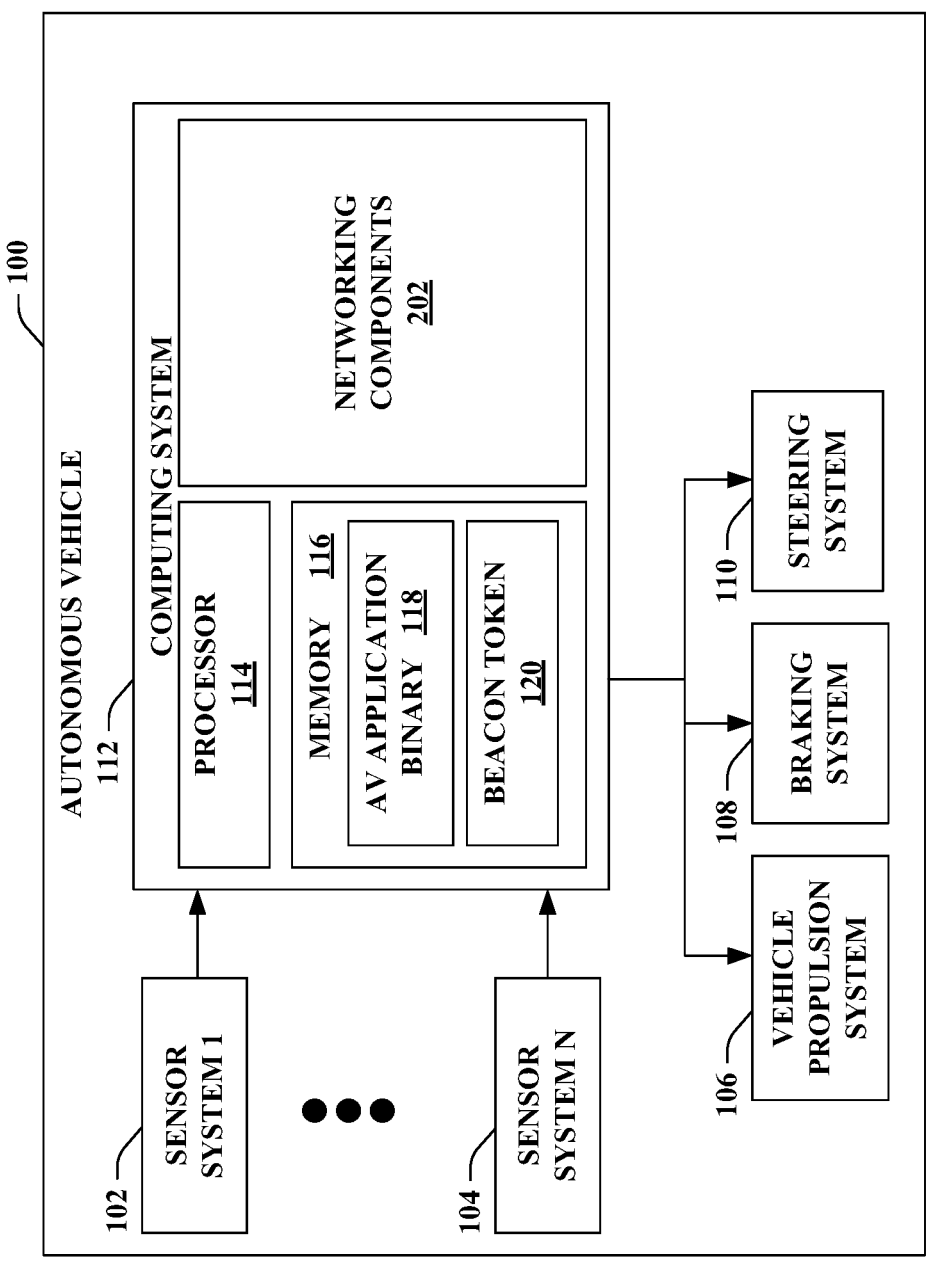
FIG. 2 illustrates a functional block diagram of an exemplary autonomous vehicle.

Turning now to FIG. 2, illustrated is the autonomous vehicle 100 in accordance with various embodiments. Again, the autonomous vehicle 100 includes the plurality of sensor systems 102-104, the computing system 112 (including the processor 114, the memory 116, the autonomous vehicle application binary 118, the beacon token 120, etc.), the vehicle propulsion system 106, the braking system 108, and the steering system 110. Although not depicted in FIG. 2, the autonomous vehicle 100 also includes the data store 122 described above in the description of FIG. 1.

As depicted in FIG. 2, the computing system 112 of the autonomous vehicle 100 further includes networking components 202. In general, the networking components 202 are configured to enable the computing system 112 to communicate with different computing devices over a plurality of networks.

Figure 3:
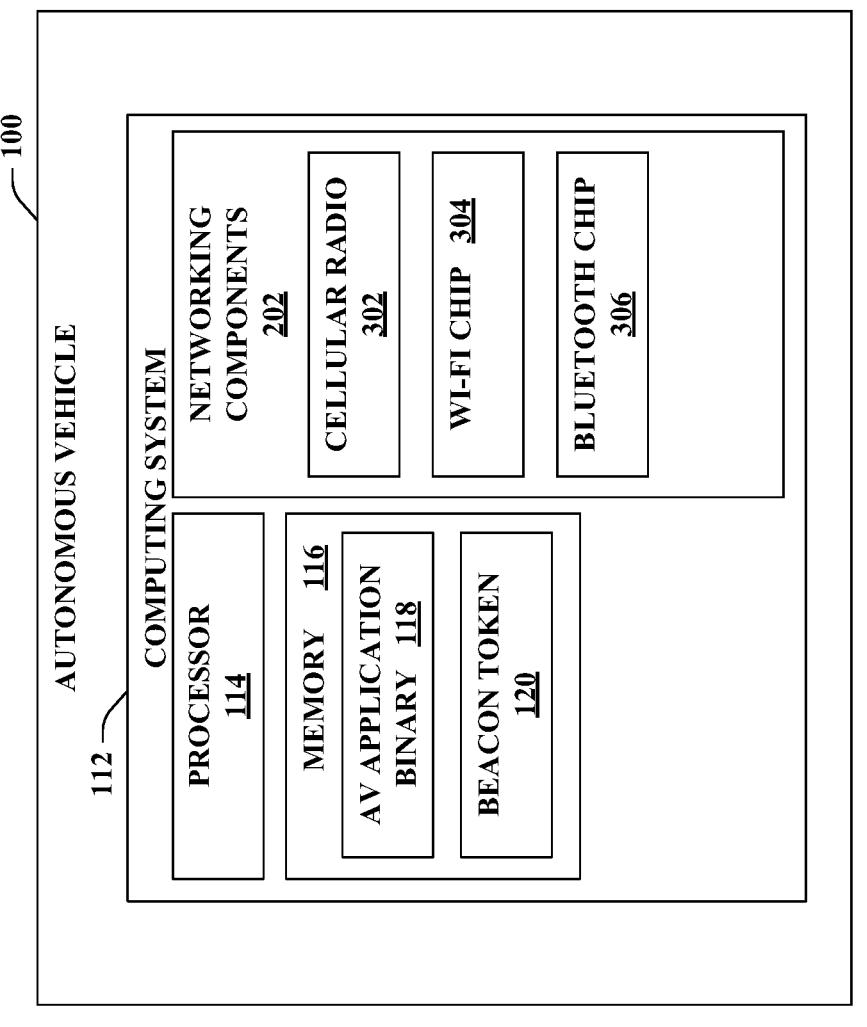
FIG. 3 illustrates a functional block diagram of an exemplary autonomous vehicle.

Referring now to FIG. 3, illustrated is the autonomous vehicle 100 in accordance with various embodiments. Again, the autonomous vehicle 100 includes the computing system 112 (including the processor 114, the memory 116, the autonomous vehicle application binary 118, the beacon token 120, the networking components 202, etc.). Although not depicted in FIG. 2, the autonomous vehicle 100 also includes the data store 122, the plurality of sensor systems 102-104, the vehicle propulsion system 106, the braking system 108, and the steering system 110 described above.

As depicted in FIG. 3, the networking components 202 may include a cellular radio 302, a wireless local area network (WLAN) chip 304, and/or a Bluetooth chip 306. The cellular radio 302 enables the computing system 112 of the autonomous vehicle 100 to communicate over cellular networks. The WLAN chip 304 enables the computing system 112 of the autonomous vehicle 100 to communicate over WLAN networks (e.g., networks that operate according to Institute of Electrical and Electronics Engineers (IEEE) 802.11 protocols). The Bluetooth chip 306 enables the computing system 112 of the autonomous vehicle 100 to communicate over Bluetooth networks.

Figure 4:
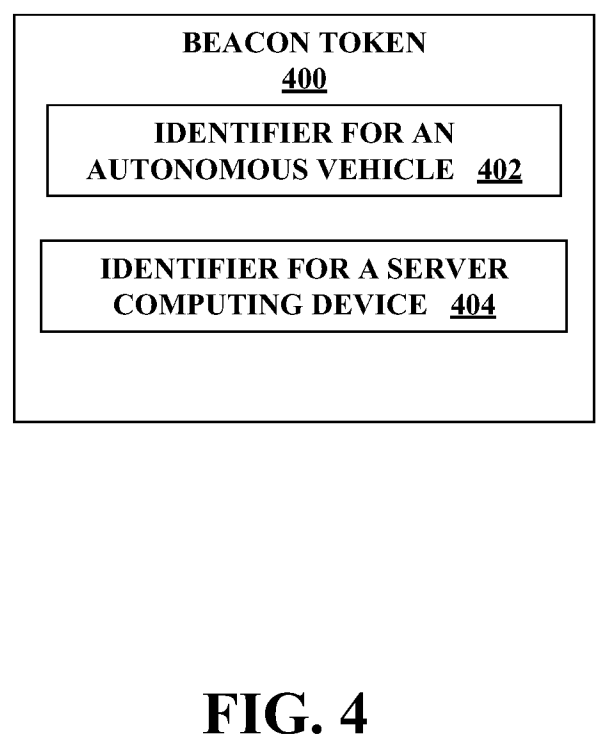

With reference now to FIG. 4, an exemplary beacon token 400 is illustrated. In an example, the beacon token 400 may be or include the beacon token 120. Moreover, the beacon token 120 may be or include the beacon token 400. The beacon token 400 comprises an identifier for an autonomous vehicle 402 (e.g., the autonomous vehicle 100 described above). For instance, the identifier for the autonomous vehicle 402 may be a string of characters (e.g., "23pjh59542845ndasdf"). The beacon token 400 also comprises an identifier for a server computing device 404 (e.g., the server computing device 600 or the second server computing device 902 described below). In an embodiment, the identifier for the server computing device 404 may be a Domain Name System (DNS) record.

Turning now to FIG. 5, another exemplary beacon token 500 is illustrated. In an example, the beacon token 500 may be or include the beacon token 120. Moreover, the beacon token 120 may be or include the beacon token 500. The beacon token 500 includes an identifier for an autonomous vehicle 502 and an identifier for a server computing device 504 similar to those described above in the description of the beacon token 400.

The beacon token 500 includes a memo field 506. The memo field 506 may include an autonomous vehicle application binary version number 508, an identifier for the autonomous vehicle application binary 510 (i.e., an identifier for the specific instance of the binary loaded on the autonomous vehicle 100), and/or miscellaneous data 512. The miscellaneous data 512 may be additional data that may be used to match the beacon token 500 with the autonomous vehicle 100. In example, the miscellaneous data 512 may include human-readable text.

Figure 6:
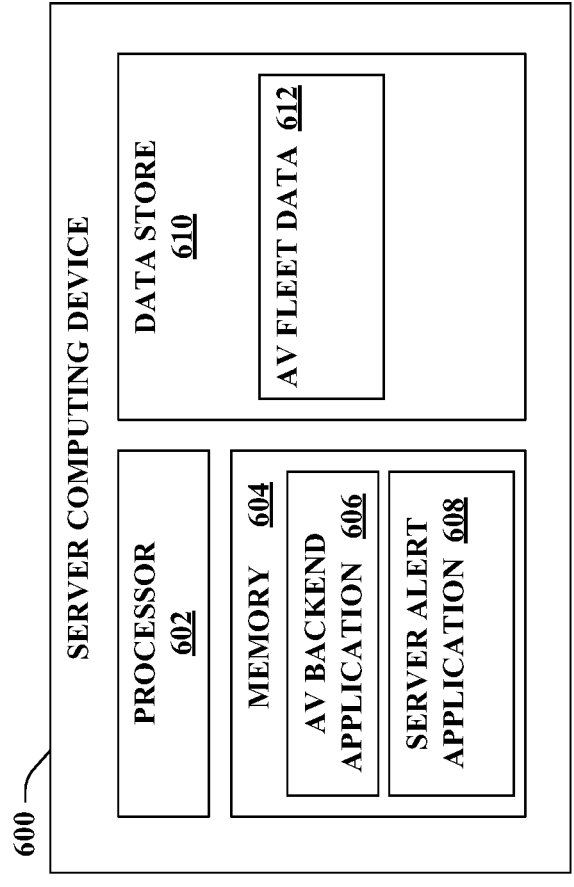
FIG. 6 illustrates a functional block diagram of a server computing device.

Referring now to FIG. 6, an exemplary server computing device 600 is illustrated. The server computing device 600 includes a processor 602 and memory 604. The memory 604 may include an autonomous vehicle backend application 606 (abbreviated as "AV backend application 606" in FIG. 6 and subsequent figures). In general, the autonomous vehicle backend application 606 (when executed by the processor 602) is configured to facilitate operation of the autonomous vehicle 100 (as well as other autonomous vehicles) about driving environments. For instance, the autonomous vehicle backend application 606 may facilitate route planning, passenger pickup, etc. The memory 604 may also include a server alert application 608. As will be described in greater detail below, the server alert application 608 is configured to detect when the autonomous vehicle 100 is operating on an untrusted network.

The server computing device 600 may also include a data store 610. The data store 610 may retain autonomous vehicle fleet data 612. The autonomous vehicle fleet data 612 is data that facilitates operation of the autonomous vehicle 100 (as well as other autonomous vehicles). For instance, the autonomous vehicle fleet data 612 may include identifiers for autonomous vehicles, historical route data, etc.

Although the server alert application 608 is depicted as separate from the autonomous vehicle backend application 606, it is to be understood that functionality of the server alert application 608 may be incorporated directly into the autonomous vehicle backend application 606. In an embodiment, the functionality of the server computing device 600 may be performed as part of a cloud computing platform. For instance, functionality of the server computing device 600 may be performed by an event driven serverless cloud platform.

Figure 7:
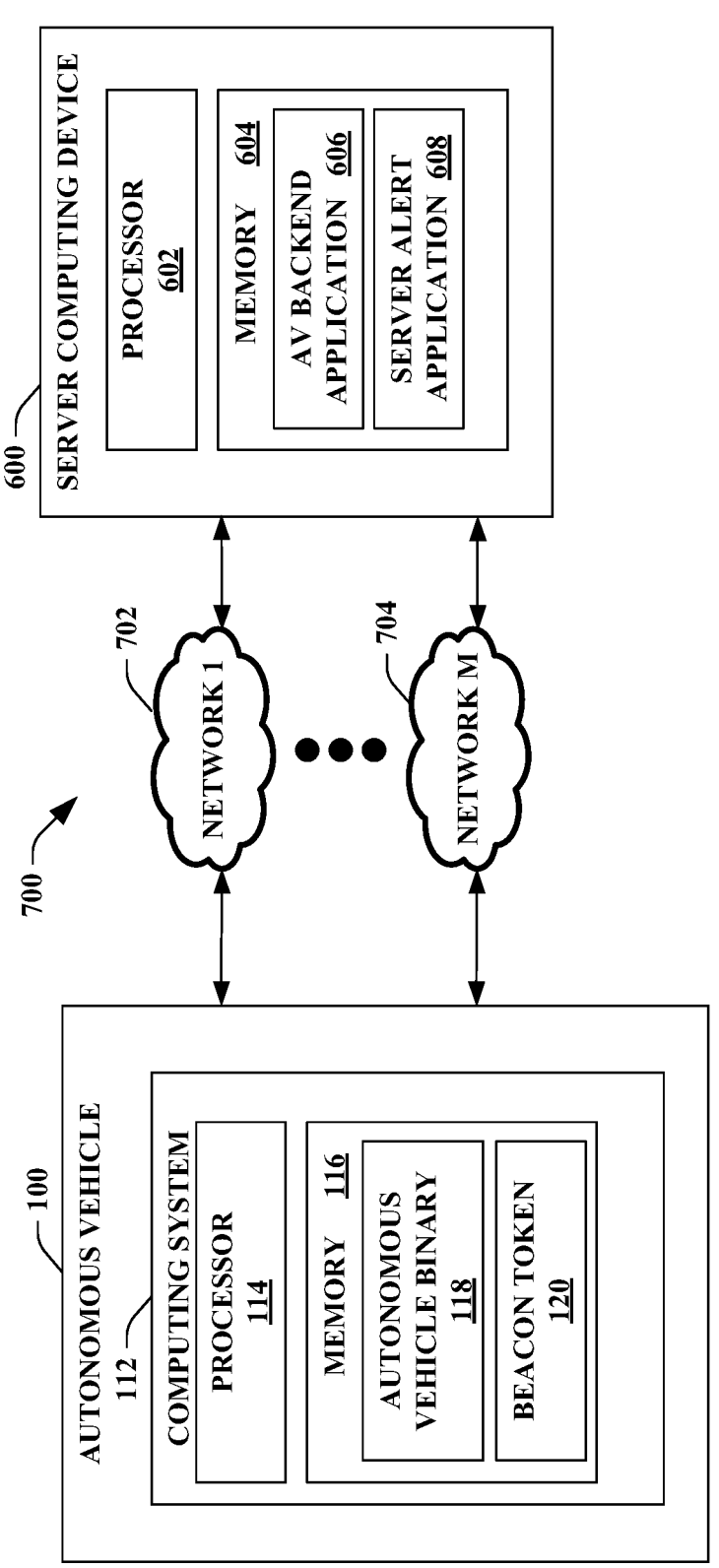
FIG. 7 illustrates an exemplary computing environment.

Turning now to FIG. 7, a computing environment 700 is illustrated. The computing environment 700 includes the autonomous vehicle 100 and the server computing device 600. The autonomous vehicle 100 and the server computing device 600 may communicate by way of a plurality of networks, namely, a network 1 702, . . . , and a network M 704, where M can be substantially any integer greater than 1 (collectively referred to herein as a plurality of networks 702-704). In an example, the plurality of networks 702-704 may include one or more cellular networks, one or more WLAN networks, one or more Virtual Private Networks (VPNs), and/or one or more Bluetooth networks. It is to be understood that some networks in the plurality of networks 702-704 may be trusted networks and other networks in the plurality of networks 702-704 may be untrusted networks. Additionally, some networks in the plurality of networks 702-704 may be unknown networks.

Although all components of the autonomous vehicle 100 are not depicted in FIG. 7, it is to be understood that the autonomous vehicle 100 includes all of the components described above in the description of FIGS. 1-3 (e.g., the plurality of sensor systems 102-104, the mechanical systems 106-110, etc.). Additionally, although all components of the server computing device 600 are not depicted in FIG. 7 (e.g., the data store 610), it is to be understood that the server computing device 600 includes all of the components described above in the description of FIG. 6.

Referring generally now to FIGS. 1-7, operation of the computing environment 700 is now set forth. It is contemplated that the autonomous vehicle 100 is operating and that the computing system 112 of the autonomous vehicle 100 is communicating with the autonomous vehicle backend application 606 by a network (either a trusted network, an untrusted network, or an unknown network) in the plurality of networks 702-704. For instance, the computing system 112 may transmit first data to the autonomous vehicle backend application 606. The autonomous vehicle backend application 606 may utilize the first data to facilitate operation of the autonomous vehicle 100 about a driving environment. The computing system 112 may also receive second data from the autonomous vehicle backend application 606. The computing system 112 may utilize the second data to facilitate operation of the autonomous vehicle 100 about the driving environment. Responsive to beginning operation, the computing system 112 of the autonomous vehicle 100 retrieves the beacon token 120 from the data store 122 and loads the beacon token 120 into the memory 116.

The computing system 112 of the autonomous vehicle 100 then generates a data packet based upon the beacon token 120. The data packet includes the identifier for the autonomous vehicle 100. The data packet may also include the identifier for the server computing device 600, a version number of the autonomous vehicle application binary 118, an identifier for the autonomous vehicle application binary 118, and/or other miscellaneous data (e.g., human-readable text) that can be used to match the beacon token 120 and the autonomous vehicle 100. Notably, the computing system 112 may fail to properly format the data packet according to requisite security protocols of trusted networks in the plurality of networks 702-704.

The computing system 112 of the autonomous vehicle 100 then transmits the data packet (using one or more of the networking components 202) to the server computing device 600 based upon the identifier for the server computing device comprised by the beacon token 120.

When the computing system 112 transmits the data packet via a trusted network in the plurality of networks 702-704, networking rules of the trusted network prevent the server computing device 600 from receiving the data packet. In an example, the networking rules of the trusted network may include a firewall which prevents the server computing device 600 from receiving the data packet. In another example, the networking rules of the trusted network may include Internet Protocol Security (IPsec) protocols that prevent the server computing device 600 from receiving the data packet.

In a specific embodiment where the identifier for the server computing device 600 is a DNS record, the networking rules of the trusted network prevent resolution of the DNS record, thereby preventing the server computing device 600 from receiving the data packet.

When the computing system 112 transmits the data packet via an untrusted network (or an unknown network) in the plurality of networks 702-704, the server computing device 600 receives the data packet. The server computing device 600 may ascertain information about the autonomous vehicle 100 (e.g., a location of the autonomous vehicle) based upon the identifier for the autonomous vehicle 100. More specifically, the server computing device 600 may ascertain the information about the autonomous vehicle 100 by executing a query over the autonomous vehicle fleet data 612 based upon the identifier for the autonomous vehicle 100. The server computing device 600 may also log (i.e., store) the data packet in the data store 610 as part of the autonomous vehicle fleet data 612.

It is to be understood that the computing system 112 of the autonomous vehicle 100 may repeatedly generate and transmit data packets as described above at a defined time interval. For instance, the computing system 112 may transmit a data packet every 1-3 seconds.

In an embodiment, responsive to receiving the data packet from the computing system 112 of the autonomous vehicle 100, the server computing device 600 may generate a second data packet. The second data packet is indicative of an action that is to be performed by the computing system 112 of the autonomous vehicle 100. The server computing device 600 may then transmit the second data packet to the computing system 112 of the autonomous vehicle 100. Responsive to receiving the second data packet, the computing system 112 of the autonomous vehicle 100 may perform the action. For example, the action may be restricting certain data sent to the server computing device 600 while the computing system 112 of the autonomous vehicle 100 is communicating via the untrusted network.

In a specific illustration, the computing system 112 of the autonomous vehicle 100 may create a VPN tunnel over an untrusted, but known network to a trusted network. For instance, the untrusted, but known network may be a cellular provider network. The computing system 112 of the autonomous vehicle may communicate over the VPN tunnel. In the specific illustration, the server computing device 600 may be a public facing server that does not require the autonomous vehicle 100 to be operating on a trusted network in order to receive the above-described data packet. In the context of the specific illustration, the untrusted network can reflect an abnormality (i.e., the autonomous vehicle 100 is no longer operating on the trusted network) with the usage of the VPN tunnel by the autonomous vehicle 100. The data packet would thus be received by the server computing device 600.

Figure 8:
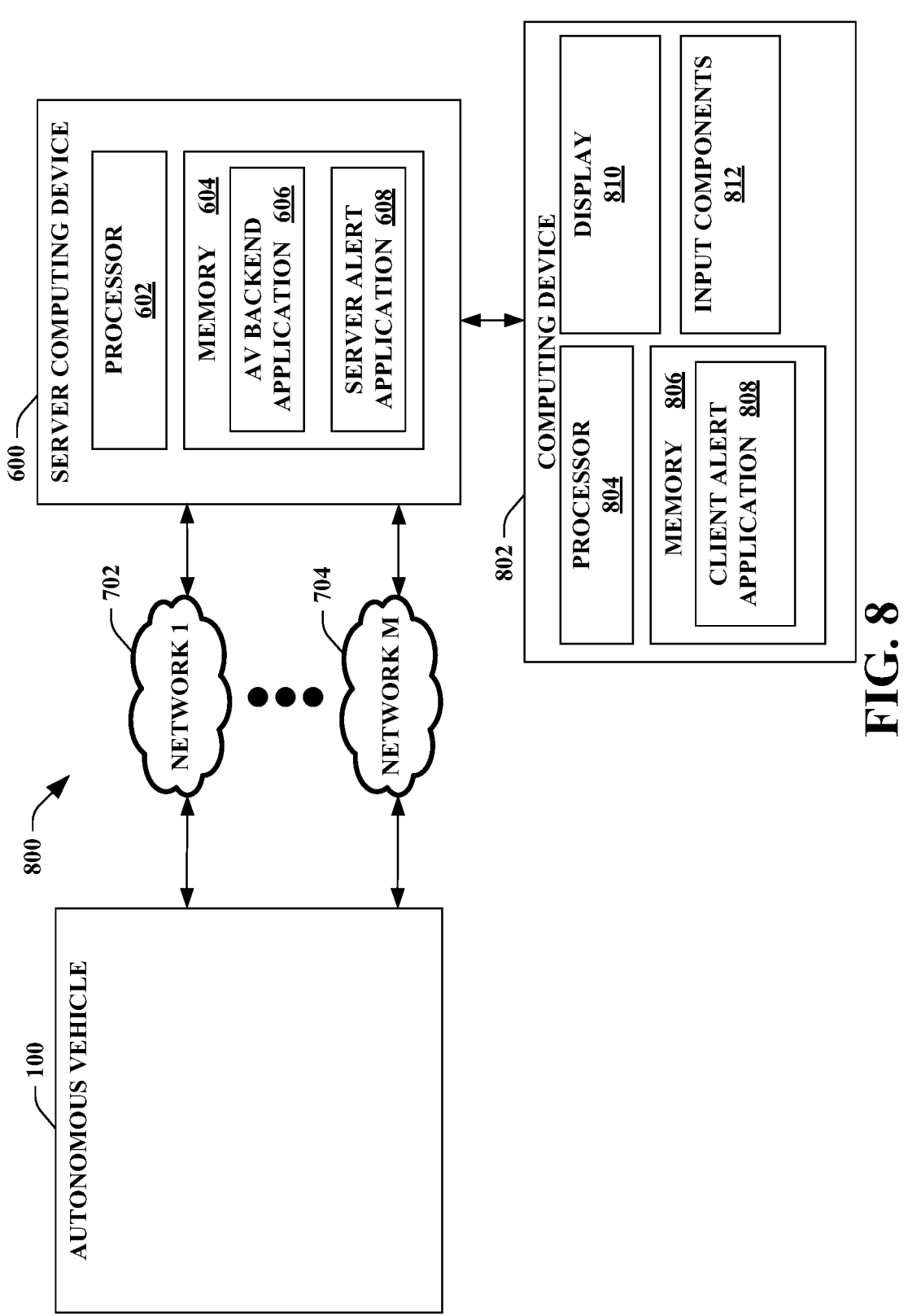
FIG. 8 illustrates an exemplary computing environment.

Referring now to FIG. 8, a computing environment 800 is illustrated. The computing environment 800 includes the components described above in the description of the computing environment 700 in FIG. 7 (e.g., the autonomous vehicle 100, the server computing device 600, the plurality of networks 702-704, etc.).

The computing environment 800 additionally includes a computing device 802. The computing device 802 is in communication with the server computing device 600 by way of a network in the plurality of networks 702-704 or another network (not shown). The computing device 802 comprises a processor 804 and memory 806, wherein the memory 806 has a client alert application 808 loaded therein. In general, the client alert application 808 (when executed by the processor 804) is configured to receive alerts generated by the server alert application 608. In an embodiment, the client alert application 808 may be a specialized application that is configured to communicate with the server alert application 608. In another embodiment, the client alert application 808 may be a generalized application (e.g., an e-mail application) that is configured to receive the alerts (e.g., via email) generated by the server alert application 608.

The computing device 802 may include a display 810, whereupon graphical features may be presented thereon. For instance, alerts generated by the server alert application 608 may be presented on the display 810. The computing device 802 may also include input components 812 suitable for data input. For instance, the input components 812 may include a mouse, a keyboard, a touchscreen, a stylus, a trackpad, a scroll wheel, a microphone, a camera, a video camera, etc.

Operation of the computing environment 800 is now set forth. The computing environment 800 operates in a manner similar to that of the computing environment 700 described above in the description of FIG. 7. For instance, the autonomous vehicle 100 retrieves the beacon token 120 from the data store 122, generates a data packet based upon the beacon token, and causes the data packet to be received by the server computing device 600 when the autonomous vehicle 100 is operating on an untrusted network in the plurality of networks 702-704. However, in the computing environment 800, subsequent to receiving the data packet, the server alert application 608 determines an identity of the untrusted network based upon the data packet. The server alert application 608 then generates an alert based upon the data packet. The alert may include the identity of the untrusted network and the identifier for the autonomous vehicle 100. The alert may also include a version number for the autonomous vehicle application binary 118 and/or an identifier for the autonomous vehicle application binary 118. In the event that the data packet includes human-readable text, the alert may also comprise the human-readable text. In an embodiment, the alert may be an email message. In another embodiment, the alert may be a webhook. The server alert application 608 then transmits the alert to the client alert application 808. Responsive to receiving the alert, the client alert application 808 presents the alert on the display 810.

Figure 9:
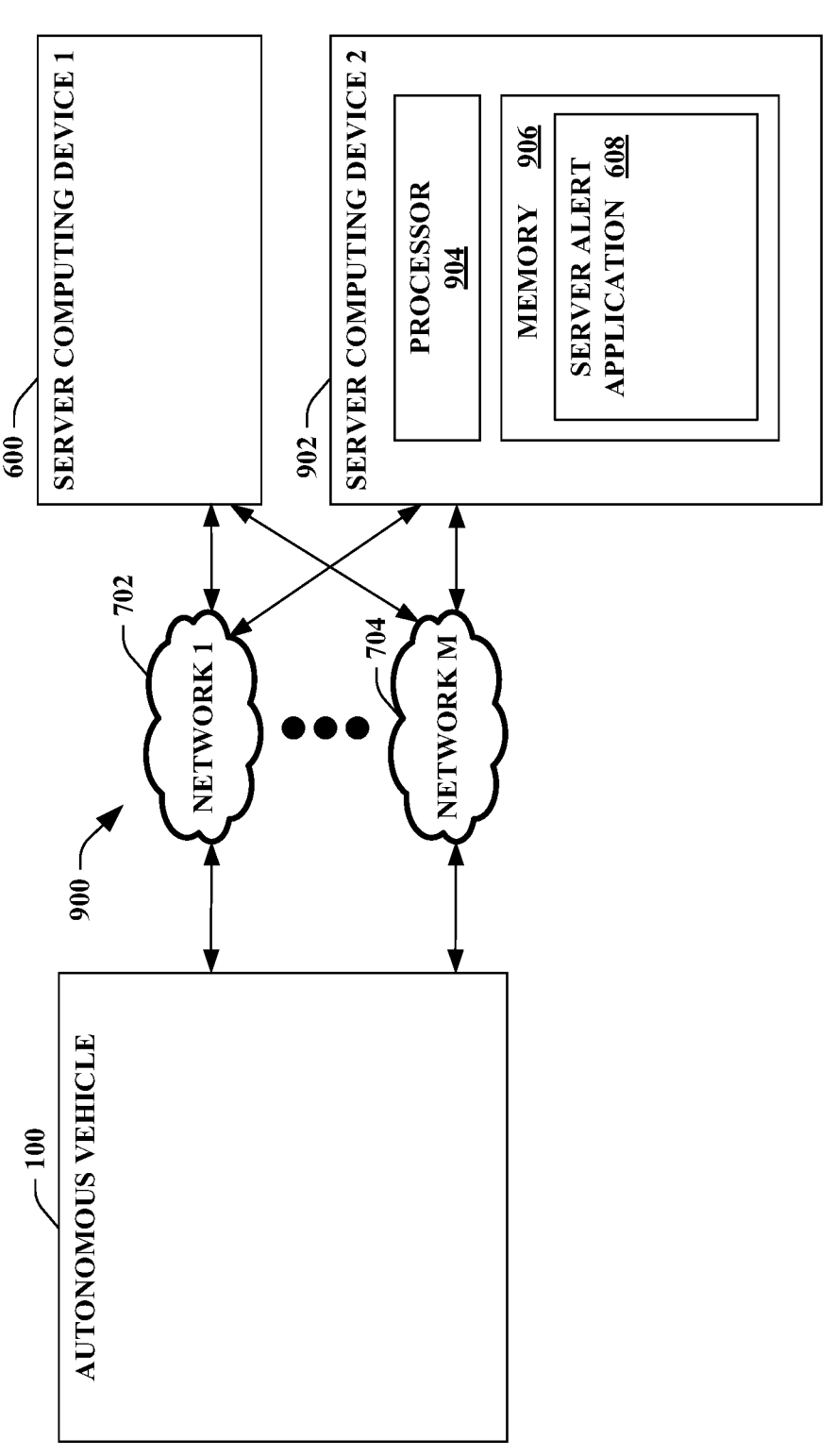
FIG. 9 illustrates an exemplary computing environment.

With reference now to FIG. 9, a computing environment 900 is illustrated. The computing environment 900 includes the components described above in the description of the computing environment 700 in FIG. 7 (e.g., the autonomous vehicle 100, the server computing device 600 (relabeled in FIG. 9 as the first server computing device 600), the plurality of networks 702-704, etc.). However, in the computing environment 900, the server alert application 608 does not execute on the first server computing device 600.

The computing environment 900 includes a second server computing device 902. The second server computing device 902 is in communication with the autonomous vehicle 100 via a network in the plurality of networks 702-704. The second server computing device 902 may also be in communication with the first server computing device 600 by way of a network in the plurality of networks 702-704 or another network.

The second server computing device 902 includes a processor 904 and memory 906, wherein the memory 906 has the server alert application 608 (described above) loaded therein. Thus, it is to be appreciated that in the computing environment 900, the autonomous vehicle backend application 606 executes on the first server computing device 600 and the server alert application 608 executes on the second server computing device 902.

In an embodiment, the functionality of the second server computing device 902 may be performed as part of a cloud computing platform. For instance, functionality of the second server computing device 902 may be performed by an event driven serverless cloud platform.

The computing environment 900 operates in a manner similar to that of the computing environment 700 or the computing environment 800 described above. However, as noted above, in the computing environment 900, the server alert application 608 executes on the second server computing device 902 (as opposed to the first server computing device 600). Therefore, in the computing environment 900, the data packet generated by the computing system 112 of the autonomous vehicle 100 (described above) is transmitted to the second server computing device 902 instead of the first server computing device 600. When the computing system 112 transmits the data packet over a trusted network in the plurality of networks 702-704, networking rules of the trusted network prevent the second server computing device 902 from receiving the data packet. When the computing system 112 transmits the data packet over an untrusted network (or an unknown network), the second server computing device 902 receives the data packet. The server alert application 608 executing on the second server computing device 902 may then generate an alert as described above. The server alert application 608 may also transmit the alert to a computing device (not shown) as described above in the description of FIG. 8.

Figure 10A:
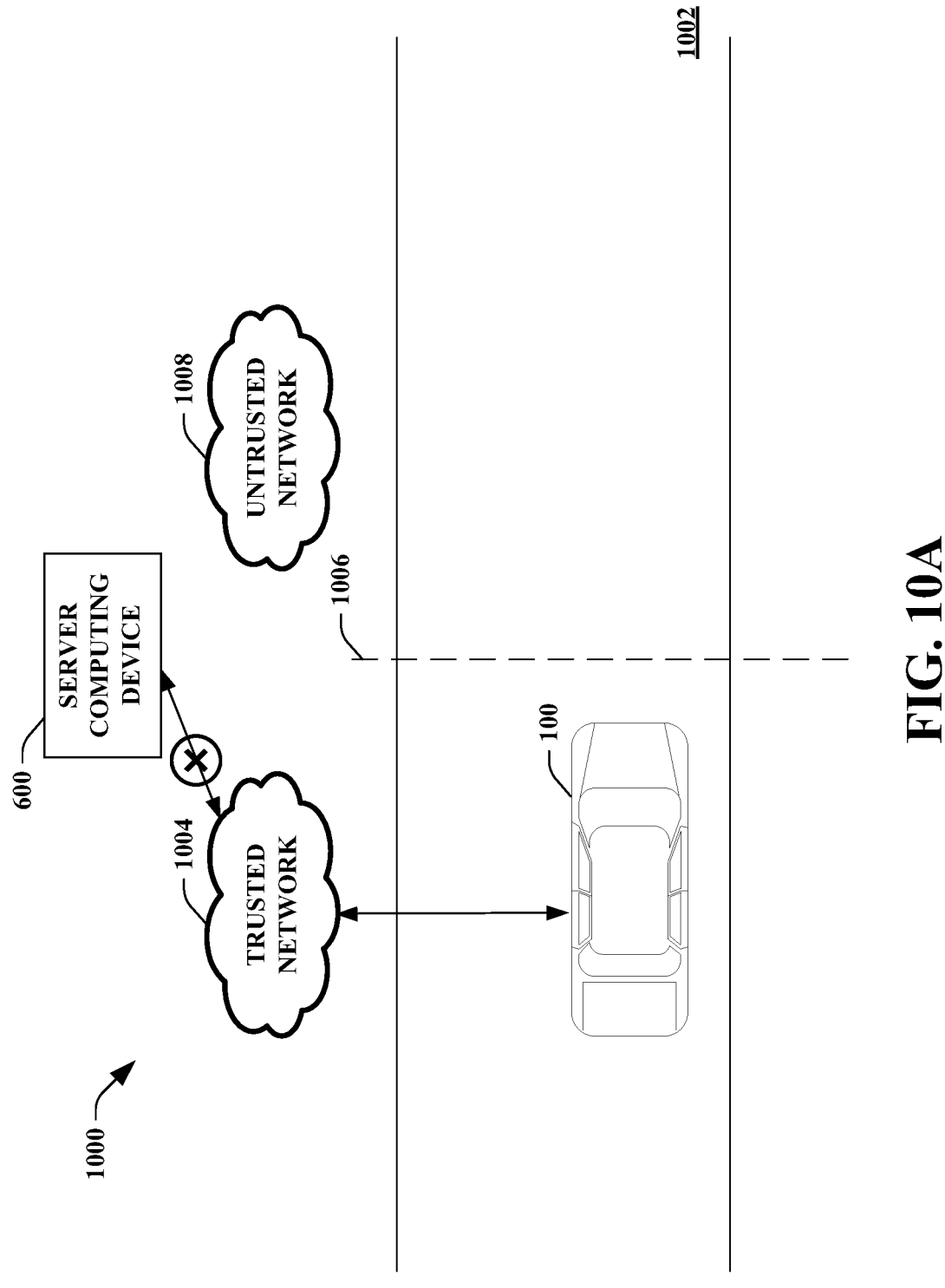
FIGS. 10A and 10B depict sequential views of a driving environment of an autonomous vehicle.
Figure 10B:
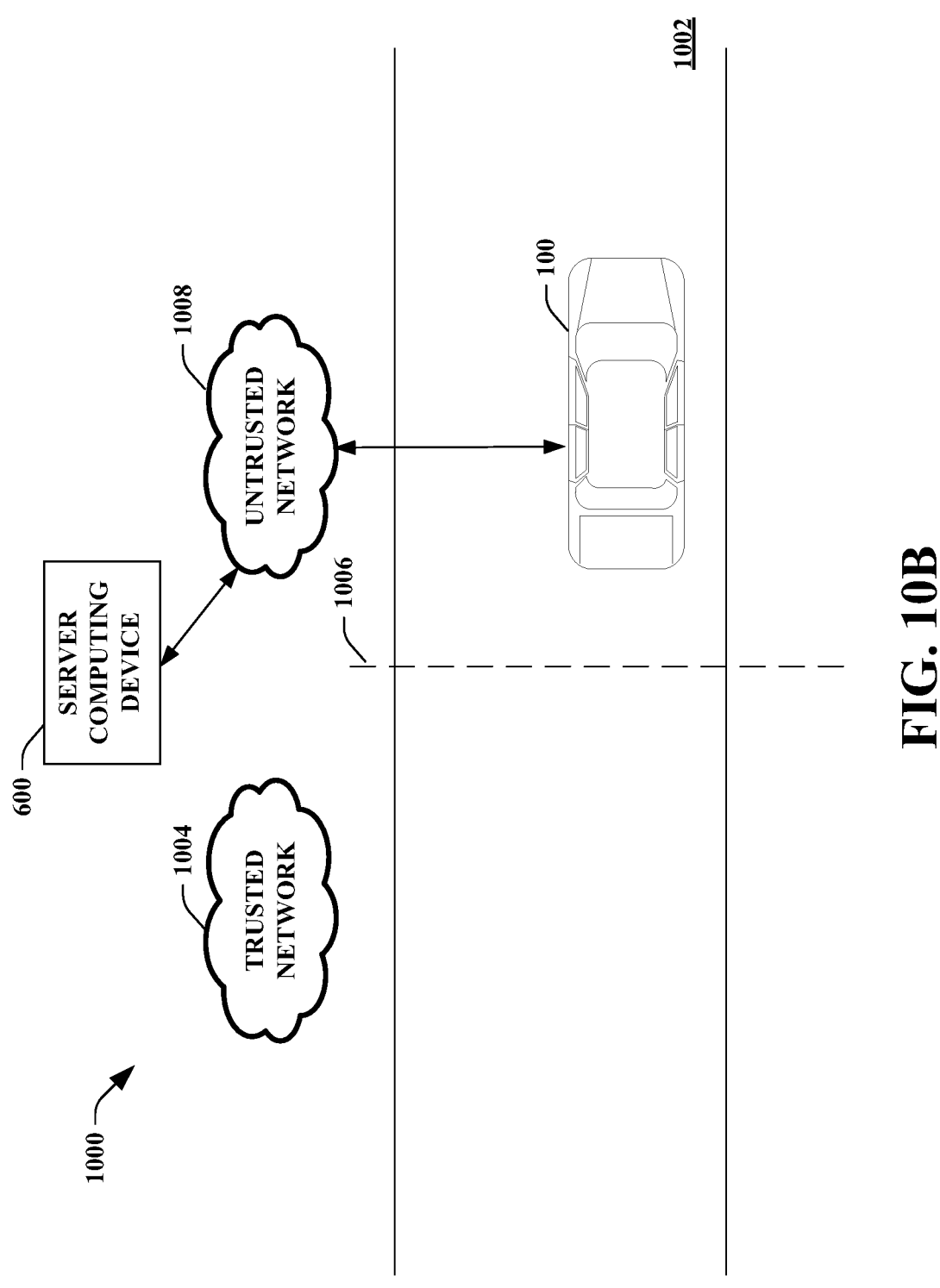

FIGS. 10A and 10B depict sequential views of a driving environment 1000. The driving environment 1000 includes the autonomous vehicle 100 and a road 1002 on which the autonomous vehicle 100 operates.

Turning now to FIG. 10A, the autonomous vehicle 100 is moving about the driving environment 1000 and is communicating with the server computing device 600 via a trusted network 1004. For instance, the trusted network 1004 may be a first WLAN, a first cellular network, etc. As described above, the autonomous vehicle 100 (by way of the computing system 112) is repeatedly transmitting data packets (including an identifier for the autonomous vehicle 100) that are generated based upon the beacon token 120. As the autonomous vehicle 100 is communicating via the trusted network 1004, networking rules of the trusted network 1004 prevent the server computing device 600 from receiving the data packets.

With reference now to FIG. 10B, the autonomous vehicle 100 has crossed a boundary 1006 causing the autonomous vehicle 100 to begin communicating with the server computing device 600 over an untrusted network 1008. For instance, the untrusted network 1008 may be a second WLAN, a second cellular network, etc. As the autonomous vehicle 100 is now communicating via the untrusted network 1008, the server computing device 600 now begins to receive the data packets from the autonomous vehicle 100. The server computing device 600 may then generate an alert as described above.

Although FIGS. 10A and 10B depict a change of networks as occurring based on a location of the autonomous vehicle 100, it is understood that the autonomous vehicle 100 may be caused to communicate over different networks based on factors other than location. Moreover, it is also understood that the autonomous vehicle 100 may change networks while remaining in the same location.

Figure 12:
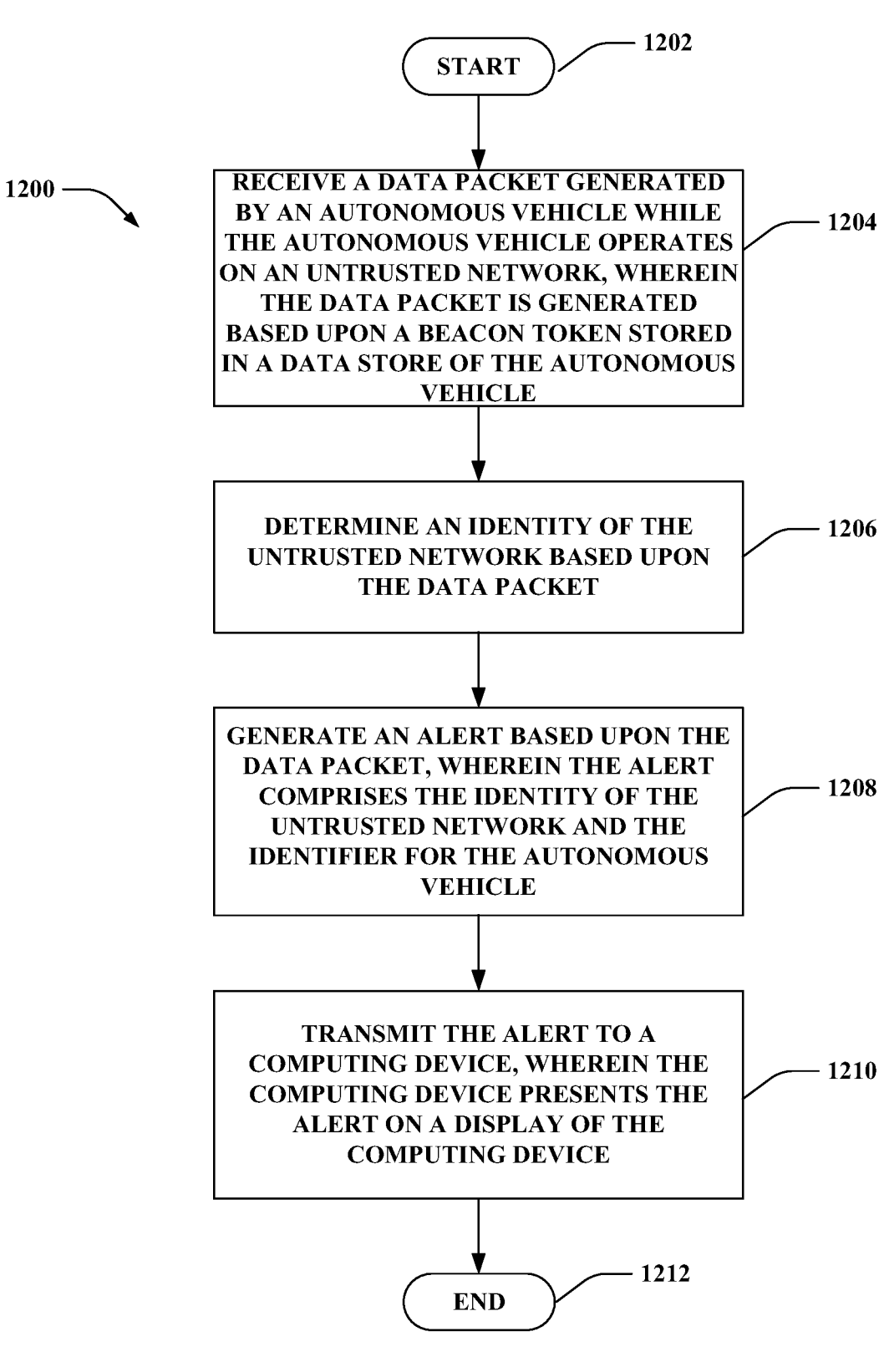
FIG. 12 is a flow diagram that illustrates an exemplary methodology performed by a server computing device for detecting operation of an autonomous vehicle on an untrusted network.
Figure 13:
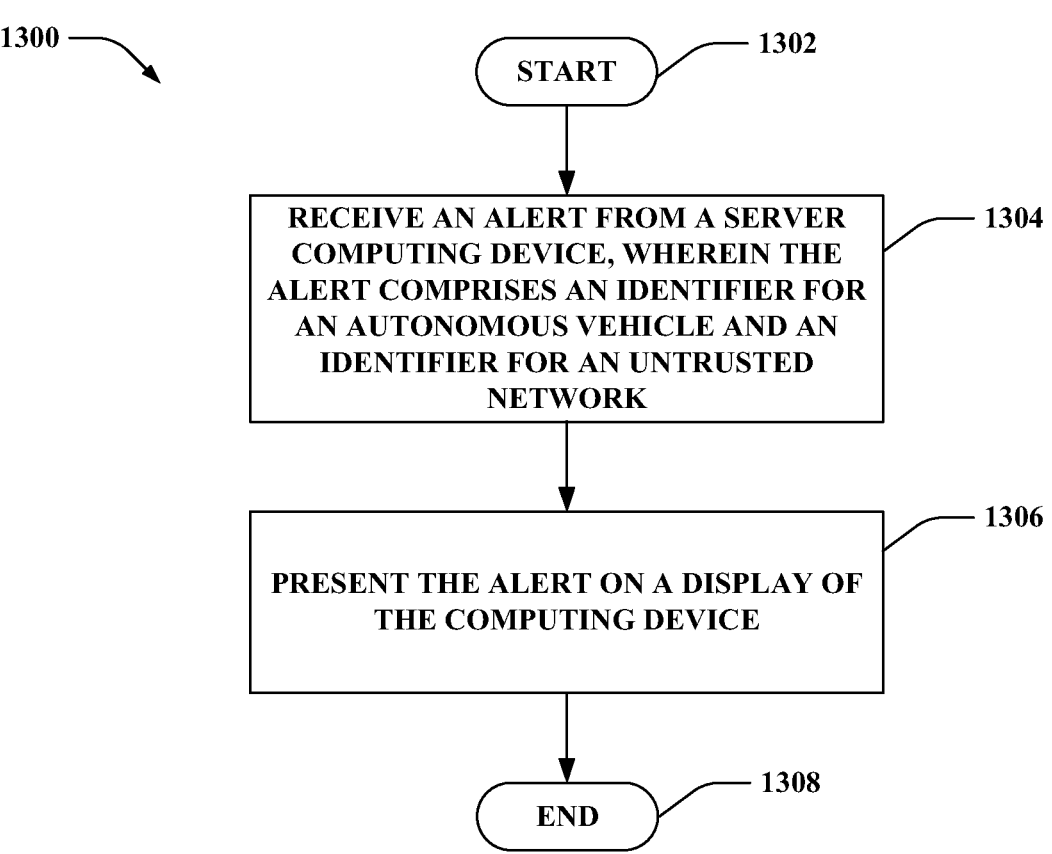
FIG. 13 is a flow diagram that illustrates an exemplary methodology performed by a computing device for detecting operation of an autonomous vehicle on an untrusted network.

FIGS. 11-13 illustrate exemplary methodologies relating to detecting operation of an autonomous vehicle on an untrusted network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 11, a methodology 1100 performed by an autonomous vehicle that facilitates detecting operation of the autonomous vehicle on an untrusted network is illustrated. The methodology 1100 begins at 1102, and at 1104 the autonomous vehicle retrieves a beacon token from a data store of the autonomous vehicle. The beacon token comprises an identifier for the autonomous vehicle and an identifier for a server computing device. At 1106, the autonomous vehicle generates a data packet based upon the beacon token. The data packet includes the identifier for the autonomous vehicle. At 1108, the autonomous vehicle transmits the data packet to the server computing device based upon the identifier for the server computing device comprised by the beacon token. The autonomous vehicle transmits the data packet via a trusted network or an untrusted network. Networking rules of the trusted network prevent the data packet from being received by the server computing device when the autonomous vehicle transmits the data packet via the trusted network. The server computing device receives the data packet when then the autonomous vehicle transmits the data packet via the untrusted network. The methodology 1100 concludes at 1110.

Turning to FIG. 12, a methodology 1200 performed by a server computing device that facilitates detecting operation of an autonomous vehicle on an untrusted network is illustrated. The methodology 1200 begins 1202, and at 1204, the server computing device receives a data packet generated by an autonomous vehicle via an untrusted network. The data packet is generated based upon a beacon token stored in a data store of the autonomous vehicle. The beacon token comprises an identifier for the autonomous vehicle and an identifier for the server computing device. The data packet includes the identifier for the autonomous vehicle. At 1206, the server computing device determines an identity of the untrusted network based upon the data packet. At 1208, the server computing device generates an alert. The alert includes the identity of the untrusted network and the identifier for the autonomous vehicle. At 1210, the server computing device transmits the alert to a computing device, wherein the computing device presents the alert on a display. The methodology 1200 concludes at 1212.

With reference now to FIG. 13, a methodology 1300 performed by a computing device that facilitates detecting operation of an autonomous vehicle on an untrusted network is illustrated. The methodology 1300 begins at 1302, and at 1304, the computing device receives an alert from a server computing device. The alert comprises an identifier for an autonomous vehicle and an identifier for an untrusted network. At 1306, the computing device presents the alert on a display of the computing device. The methodology 1300 concludes at 1308.

Referring now to FIG. 14, a high-level illustration of an exemplary computing device 1400 that can be used in accordance with the systems and methodologies disclosed herein is illustrated. For instance, the computing device 1400 may be or include the computing system 112, the server computing device 600, the computing device 802, the second server computing device 902, etc. The computing device 1400 includes at least one processor 1402 that executes instructions that are stored in a memory 1404. The instructions may be, for instance, instructions for implementing functionality described as being carried out by one or more systems discussed above or instructions for implementing one or more of the methods described above. The processor 1402 may be a GPU, a plurality of GPUs, a CPU, a plurality of CPUs, a multi-core processor, etc. The processor 1402 may access the memory 1404 by way of a system bus 1406. In addition to storing executable instructions, the memory 1404 may also store autonomous vehicle application binaries, autonomous vehicle backend applications, beacon tokens, data packets, and so forth.

The computing device 1400 additionally includes a data store 1408 that is accessible by the processor 1402 by way of the system bus 1406. The data store 1408 may include executable instructions, autonomous vehicle application binaries, autonomous vehicle backend applications, beacon tokens, data packets, etc. The computing device 1400 also includes an input interface 1410 that allows external devices to communicate with the computing device 1400. For instance, the input interface 1410 may be used to receive instructions from an external computer device, etc. The computing device 1400 also includes an output interface 1412 that interfaces the computing device 1400 with one or more external devices. For example, the computing device 1400 may transmit control signals to the vehicle propulsion system 106, the braking system 108, and/or the steering system 110 by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Figure 15:
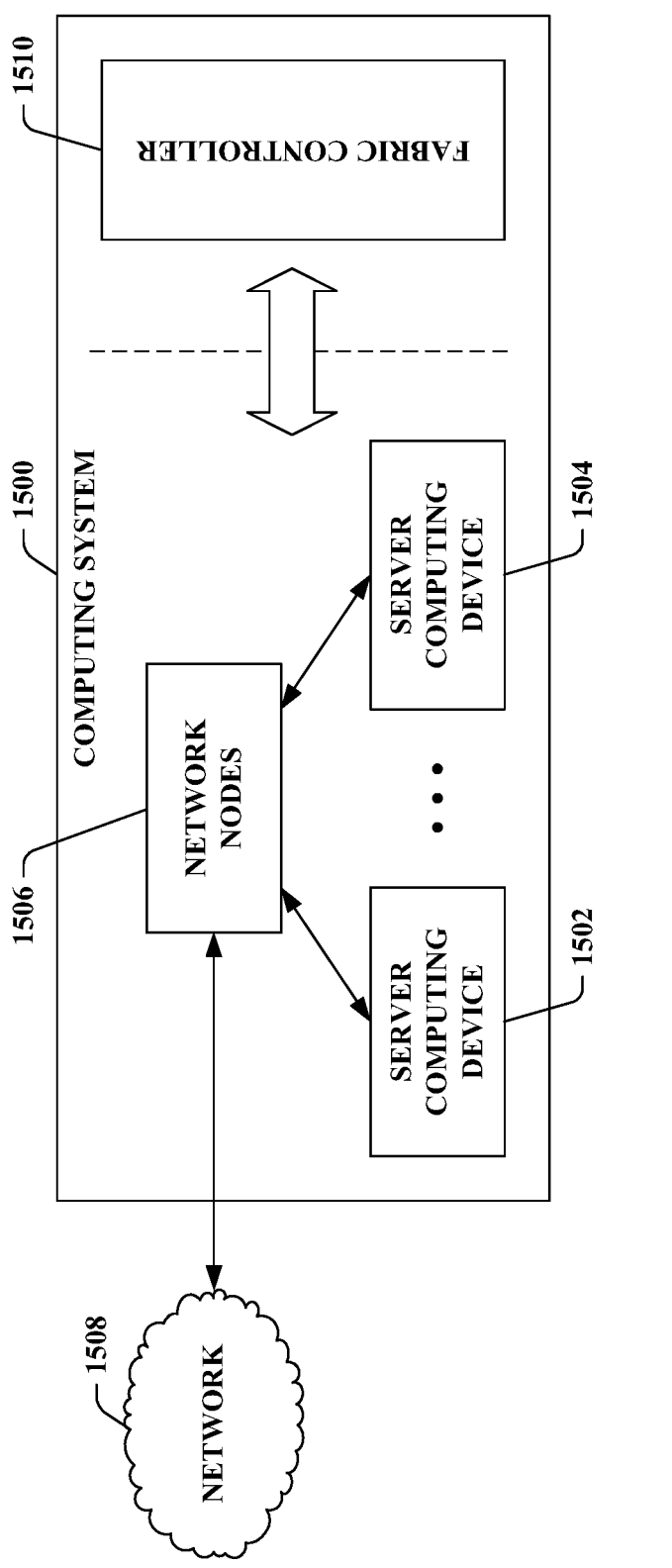
FIG. 15 illustrates an exemplary distributed computing system.

Turning to FIG. 15, a high-level illustration of an exemplary computing system 1500 that can be used in accordance with the systems and methodologies disclosed herein is illustrated. For instance, the computing system 1500 can be or include the server computing device 600, the second server computing device 902, etc. Additionally or alternatively, the server computing device 600 and/or the second server computing device 902 can be or include the computing system 1500.

The computing system 1500 includes a plurality of server computing devices, namely, a server computing device 1502, . . ., and a server computing device 1504 (collectively referred to as server computing devices 1502-1504). The server computing device 1502 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1502, at least a subset of the server computing devices 1502-1504 other than the server computing device 1502 each respectively include at least one processor and a memory. Moreover, at least a subset of the server computing devices 1502-1504 include respective data stores.

Processor(s) of one or more of the server computing devices 1502-1504 can be or include the processor 602 and/or the processor 904. Further, a memory (or memories) of one or more of the server computing devices 1502-1504 can be or include the memory 604 and/or the memory 906. Moreover, a data store (or data stores) of one or more of the server computing devices 1502-1504 can be or include the data store 610.

The computing system 1500 further includes various network nodes 1506 that transport data between the server computing devices 1502-1504. Moreover, the network nodes 1502 transport data from the server computing devices 1502-1504 to external nodes (e.g., external to the computing system 1500) by way of a network 1508. The network nodes 1506 also transport data to the server computing devices 1502-1504 from the external nodes by way of the network 1508. The network 1508, for example, can be the Internet, a cellular network, or the like. The network nodes 1506 include switches, routers, load balancers, and so forth.

A fabric controller 1510 of the computing system 1500 manages hardware resources of the server computing devices 1502-1504 (e.g., processors, memories, data stores, etc. of the server computing devices 1502-1504). The fabric controller 1510 further manages the network nodes 1506. Moreover, the fabric controller 1510 manages creation, provisioning, de-provisioning, and supervising of virtual machines instantiated upon the server computing devices 1502-1504.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:
a processor; and
memory that stores computer-executable instructions that, when executed by the processor, cause the processor to perform acts comprising:
receiving data from an autonomous vehicle over a network; and
detecting whether the network is a trusted network or an untrusted network, wherein the detecting is based on whether a data packet generated by the autonomous vehicle based on a beacon token is received such that receipt of the data packet indicates to the server computing device that the network over which the autonomous vehicle and the server computing device communicate the data is an untrusted network and a lack of the data packet being received at the server computing device indicates to the server computing device that the network over which the autonomous vehicle and the server computing device communicate the data is a trusted network.

2. The server computing device of claim 1, wherein the data packet generated by the autonomous vehicle based on the beacon token is repeatedly transmitted by the autonomous vehicle at a predefined time interval.

3. The server computing device of claim 1, the acts further comprising:
responsive to detecting that the network is an untrusted network, transmitting a second data packet from the server computing device to the autonomous vehicle via the network, wherein the second data packet specifies an action to be performed by the autonomous vehicle.

4. The server computing device of claim 3, wherein the action comprises restricting certain data from being sent by the autonomous vehicle to the server computing device while communicating over an untrusted network.

5. The server computing device of claim 3, wherein the action comprises creating a Virtual Private Network (VPN) tunnel over the network.

6. The server computing device of claim 1, the acts further comprising:

responsive to detecting that the network is an untrusted network, identifying an identity of the network based on the data packet.

7. The server computing device of claim 6, the acts further comprising:

responsive to identifying the identity of the network when the network is detected to be an untrusted network:

generating an alert based on the data packet; and transmitting the alert to a computing device.

8. The server computing device of claim 1, wherein the data packet comprises a first identifier for the autonomous vehicle and a second identifier for the server computing device.

9. The server computing device of claim 8, wherein the data packet further comprises at least one of a version number of an autonomous vehicle application binary loaded in memory of the autonomous vehicle or a third identifier for the autonomous vehicle application binary.

10. The server computing device of claim 1, wherein the network is one of a cellular network or a wireless local area network (WLAN).

11. The server computing device of claim 1, wherein the data packet comprises a Domain Name System (DNS) record of the server computing device, and wherein networking rules of a trusted network prevent resolution of the DNS record.

12. The server computing device of claim 1, wherein networking rules of a trusted network include Internet Protocol Security (IPSec) protocols that prevent the server computing device from receiving the data packet.

13. The server computing device of claim 1, wherein a firewall of a trusted network prevents the server computing device from receiving the data packet.

14. A method performed by a server computing device, comprising:

receiving data from an autonomous vehicle over a network; and detecting whether the network is a trusted network or an untrusted network, wherein the detecting is based on whether a data packet generated by the autonomous vehicle based on a beacon token is received such that receipt of the data packet indicates to the server computing device that the network over which the autonomous vehicle and the server computing device communicate the data is an untrusted network and a lack of the data packet being received at the server computing device indicates to the server computing device that the network over which the autonomous vehicle and the server computing device communicate the data is a trusted network.

15. The method of claim 14, further comprising:

responsive to detecting that the network is an untrusted network, transmitting a second data packet from the server computing device to the autonomous vehicle via the network, wherein the second data packet specifies an action to be performed by the autonomous vehicle.

16. The method of claim 15, wherein the action comprises restricting certain data from being sent by the autonomous vehicle to the server computing device while communicating over an untrusted network.

17. The method of claim 15, wherein the action comprises creating a Virtual Private Network (VPN) tunnel over the network.

18. The method of claim 14, further comprising:

responsive to detecting that the network is an untrusted network, identifying an identity of the network based on the data packet.

19. A server computing device, comprising:

a processor; and memory that stores computer-executable instructions that, when executed by the processor, cause the processor to perform acts comprising:

receiving a data packet from an autonomous vehicle over a network, wherein the data packet is generated by the autonomous vehicle based on a beacon token;

identifying that the network over which the autonomous vehicle and the server computing device communicate is an untrusted network, wherein receipt of the data packet indicates to the server computing device that the network over which the autonomous vehicle and the server computing device communicate is an untrusted network, and wherein a lack of the data packet being received at the server computing device indicates to the server computing device that the network over which the autonomous vehicle and the server computing device communicate is a trusted network; and responsive to identifying that the network is an untrusted network, transmitting a second data packet from the server computing device to the autonomous vehicle via the network, wherein the second data packet specifies an action to be performed by the autonomous vehicle.

20. The server computing device of claim 19, wherein the action comprises at least one of:

restricting certain data from being sent by the autonomous vehicle to the server computing device while communicating over an untrusted network; or creating a Virtual Private Network (VPN) tunnel over the network.

* * * * *